United States Patent

Belew

[15] 3,675,376
[45] July 11, 1972

[54] THERMAL COMPENSATING STRUCTURAL MEMBER

[72] Inventor: Robert R. Belew, Huntsville, Ala.

[73] Assignee: The United States of America as represented by the Administrator of the National Aeronautics and Space Administration

[22] Filed: Feb. 12, 1971

[21] Appl. No.: 114,847

[52] U.S. Cl. ................................................52/1, 52/573
[51] Int. Cl. ................................E04c 3/00, G04b 17/20
[58] Field of Search............58/133; 52/1, 573; 248/54 CS; 331/94.5

[56] References Cited

UNITED STATES PATENTS

| | | | |
|---|---|---|---|
| 3,201,076 | 8/1965 | Deleuze | 52/573 |
| 3,229,224 | 1/1968 | Waly et al. | 331/94.5 |
| 3,412,551 | 11/1968 | Swinzow | 58/133 |
| 3,468,080 | 9/1969 | Hansen | 52/573 |
| 3,528,206 | 9/1970 | Baird | 52/1 |

*Primary Examiner*—Henry C. Sutherland
*Attorney*—L. D. Wofford, Jr., C. C. Wells and John R. Manning

[57] ABSTRACT

A structural member that remains near a constant length when subjected to varying thermal loads. The structure includes an outer bi-metallic housing composed of inner and outer concentrically spaced casings attached to one another at one of their ends and left free to expand and contract at the other of their ends. The casings are made of materials having different coefficients of expansion and therefore their lengths will vary with respect to one another as their thermal environment changes. A compensator strut is slidably mounted in the outer housing. A compensating drive linkage mounted on the free ends of the inner and outer casings so as to be rotated by relative movement between the casings is connected to the strut and causes sliding movement thereof to maintain the structure at a constant length when the components thereof change lengths due to expansion and contraction.

7 Claims, 6 Drawing Figures

ROBERT R. BELEW
*INVENTOR*

BY Charles C. Wells

*ATTORNEY*

ROBERT R. BELEW
INVENTOR

BY Charles C. Wells
ATTORNEY

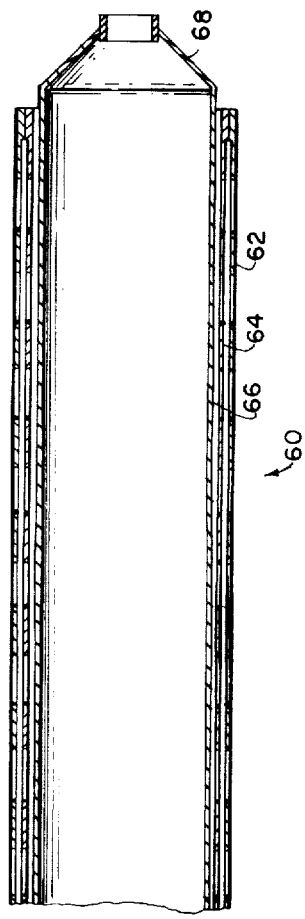
FIG. 6
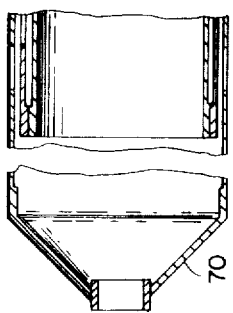
ROBERT R. BELEW
INVENTOR
BY Charles C. Wells
ATTORNEY 3,675,376

THERMAL COMPENSATING STRUCTURAL MEMBER

ORIGIN OF THE INVENTION

The invention described herein was made by an employee of the United States Government and may be manufactured and used by or for the Government for governmental purpose without the payment of any royalties thereon or therefor.

BACKGROUND OF THE INVENTION

1. Field of the Invention

The invention relates generally to structural members designed to maintain a constant length when subjected to a changing thermal environment. More particularly the invention relates to such members employing bimetallic components having different coefficients of expansion in conjunction with a compensating drive linkage to achieve constant length during thermal changes.

2. Discussion of the Prior Art

There are numerous applications for structures in which dimension changes due to expansion and contraction can be kept to a minimum; one important application being for fabrication of various types of antennas designed for use in orbit about the earth. Such an antenna is subjected to greatly varying thermal loads, depending upon whether it is exposed or shaded from the sun's radiation, and the antenna will be distorted as the structural components thereof expand and contract. Distortion affects the antenna shape which is critical to transmitting efficiency thereof so distortion is an important factor to be considered when designing an antenna, particularly one for use in space where thermal variations are extreme.

Heretofore the approach employed to achieve acceptable, or at least optimum, dimensional stability for antennas has been to use surface coatings to control the thermal emissivity and reflectivity of the structure surfaces and thus, to some extent, the expansion and contraction of the antenna. The disadvantage of this solution is that the effectiveness of surface coatings is dependent upon a predictable set of conditions, such as structural surface orientation with respect to the sun or other source of thermal energy and precise information as to possible changes in the thermal environment.

SUMMARY OF THE INVENTION

It is an object of the invention to provide a structural member that remains a substantially constant length during changes in the thermal environment that result in expansion and contraction of the materials from which the member is made.

Another object of the invention is to provide a structural member having bi-metallic tubular components and employing the lever principle to achieve near constant length under a varying thermal environment.

The invention that accomplishes the above and other objects is a tubular structure that can be used as a cross-member in an antenna structure. The invention includes an outer housing comprised of an inner and outer casing; the two casings being joined at one end and left free at their other end to expand and contract. The casings are made of dissimilar materials having different coefficients of expansion and therefore their lengths will vary with respect to one another as their thermal environment changes. A compensator strut is slidably mounted in the outer housing and this strut is connected to and moved relative to the outer housing by a compensating drive linkage. The linkage includes a lever that is pivotally attached to both the inner and outer casing and to the compensator strut whereby relative movement between the two casings will pivot the lever and slide the compensator strut in or out of the outer housing an amount that compensates for any expansion or contraction of the outer housing, thus keeping the overall length of the structure constant. By choosing appropriate materials for the outer housing and the compensator strut, and a suitable lever length and mounting, the compensator strut can be moved relative to the outer housing just enough to compensate for length changes in the structure and maintain the overall structure at a constant length.

BRIEF DESCRIPTION OF THE DRAWINGS

FIG. 6 is a cross-sectional view of an alternate embodiment of the invention wherein three concentrically arranged tubular members are employed to achieve length stability.

DETAILED DESCRIPTION OF THE INVENTION

A space station 10 is shown having an antenna structure 12 mounted thereon that includes a dish-shaped framework 14 that is composed of numerous cross members. The dish-shaped framework is constructed to support a reflecting mesh (not shown) in a particular curvature, parabolic being a commonly used curvature, and this curvature is critical to peak transmitting efficiency. It can be readily understood how thermal changes that cause the cross-members making up the antenna to expand and contract would result in dimensional changes that would affect the curvature of the antenna. It is also obvious that the antenna design would be greatly facilitated by cross-members that maintain a near constant length when subjected to changes in thermal environment.

Figure 1:
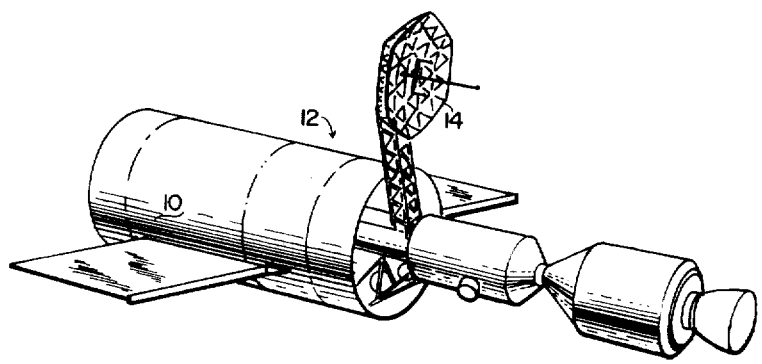
FIG. 1 is a pictorial view of a spacecraft with a deployed antenna of a type which could utilize cross members and the like constructed in accordance with this invention.
Figure 2:
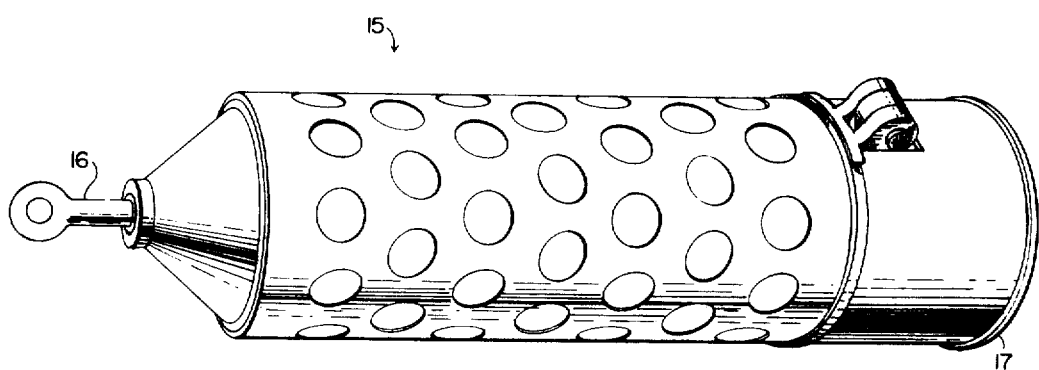
FIG. 2 is a pictorial view of a near-constant-length tubular structure.

In FIG. 2 a thermal compensating structural member 15 is shown having a connecting eye 16 on one end thereof that can be connected to an associated structure and a mounting flange 17 on the other end also for attachment to an associated structure. The connecting eye and flange are just one type of mounting that was chosen for illustration and it should be understood that the member could be provided with any type of mounting bracket or the like deemed desirable or necessary.

Figure 3:
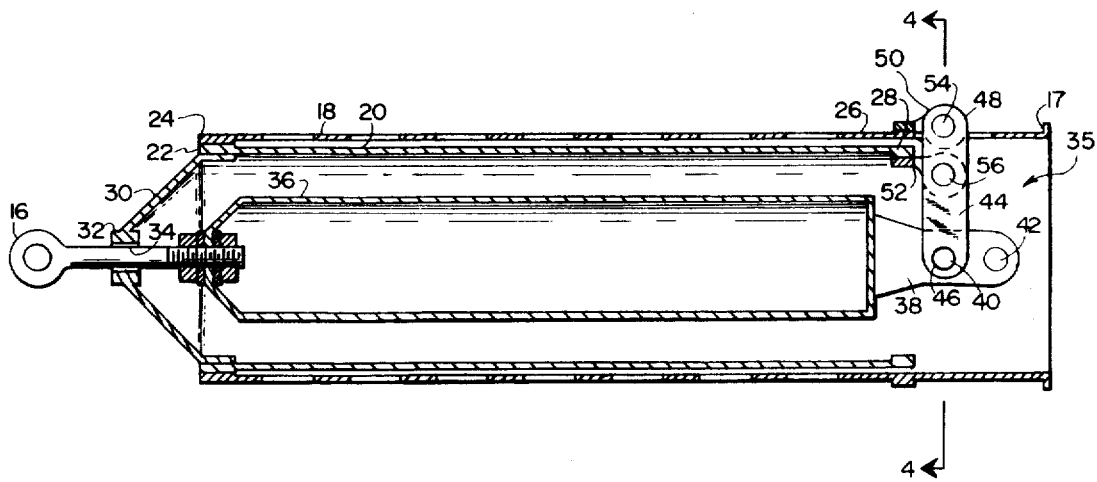
FIG. 3 is a cross-sectional view of the structure illustrated pictorially in FIG. 2.

Structural member 15, shown more clearly in cross-section in FIG. 3, includes an elongated hollow body composed of outer casing 18 and an inner casing 20. End 22 of casing 20 is joined to end 24 of casing 18. Ends 26 and 28 of casings 18 and 20 are left free to expand and contract relative to one another when the structural member is subjected to thermal changes. Casing 18 is shown perforated to expose casing 20 to solar radiation. Casing 20 is not perforated, however perforations could be employed if warranted. To assure uniform heat conduction to both casings high conductivity heat paths can be provided between the adjacent casing walls by bonding foil strips 21 (see FIG. 5) of aluminum or other suitable heat conductive material between the casings. Foil strips could likewise be employed to provide high conductivity heat paths between members 20 and 36. The foil strips are of sufficient length to allow for expansion or contraction of the casings without rupturing of the foil.

Figure 4:
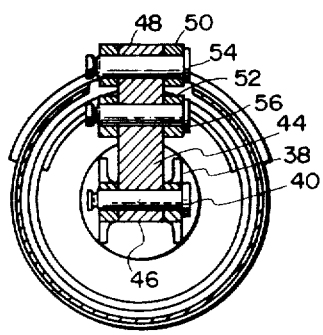
FIG. 4 is a cross-sectional view taken along lines 4—4 of FIG. 3.

One end of the hollow body is substantially closed by a plug 30 having a collar 32 mounted in the center thereof. Collar 32 has a sleeve bearing 34 mounted therein in which end connector 16 slides. End connector 16 is bolted to one end of a tubular compensator strut 36 supported in the center of the hollow body. A drive linkage 35 is connected to the other end of strut 36 by means of a bracket 38 attached to strut 36. Bracket 38 has pins 40 and 42 mounted thereon. The drive linkage includes a lever 44 with one of its ends, end 46, mounted on a pin 40 and the other end, end 48, attached to casings 18 and 20. Casing 18 has a hinge 50 suitably mounted thereon (see FIG. 4) by brazing or the like and casing 20 has a similar hinge 52 mounted thereon. Pins 54 and 56 supported in hinges 50 and 52 are mounted through holes formed in end 48 of lever 44 for pivotally mounting the lever to casings 18 and 20.

The link illustrated in FIG. 3 would function as follows, assuming that casing 20 is composed of aluminum, casing 18 of titanium, and the thermal environment is changing from cold to warm so that the various components of the structural member will expand. The thermal coefficient of expansion of the aluminum casing is about 2.75 times that of the titanium casing so that upon expansion there will be more elongation of casing 20 than of casing 18. This will cause pin 56 to move to the right (as viewed in FIG. 3) relative to pin 54 and will result in counterclockwise rotation of link 44. This counterclockwise movement will move strut 36 to the right and reduce the overall length of the structural members. By proper selection of materials for casings 18 and 20, and strut 36, and by choosing a suitable lever length and spacing of the pins 54, 56 and 40, strut 36 can be retracted an amount that will compensate for expansion of the member and maintain a near constant length during changes in the thermal environment.

Figure 5:
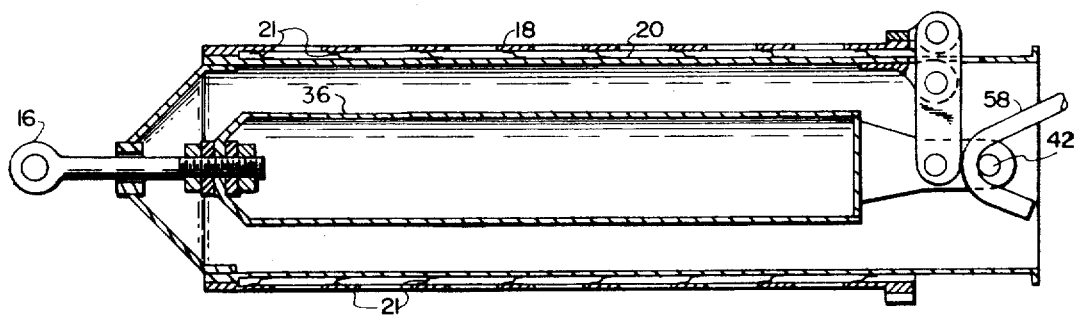
FIG. 5 is a cross-sectional view of a structure similar to that shown in FIG. 3 except that the inner casing is adapted for connection to a supporting structure rather than the outer casing as in FIG. 3.

The link shown in FIG. 5 is essentially the same as that shown in FIG. 3 and functions similarly. In FIG. 5, inner casing 20 has been provided with a mounting flange rather than outer casing 18. Also, strips of conducting foil 21 have been connected between casings 18 and 20 to facilitate heat transfer therebetween. In addition, strut 36 is biased to the right, as viewed in FIG. 5, by means of a helper spring 58 that bears against pin 42. The spring could be attached in any suitable manner to an associated structure (not shown) so as to be placed in tension. The helper spring would be used to decrease the load on the drive linkage and would be employed with a structural member loaded in tension. The structural member shown in FIG. 3 could be provided with a helper spring if desired.

An alternate embodiment of the invention is illustrated in FIG. 6 wherein structural member 60 includes an outer perforated casing 62, an intermediate casing 64 and an inner casing 66. A plug 68 attached to one end of casing 66 closes one end of the member and a second plug 70 attached to one end of casing 62 closes the other end of the member. Plugs 68 and 70 include mounting collars for attaching member 60 to associated structures, but other types of mounting means could be employed if desired. In this type of member casings 62 and 66 are of the same material, a material of low thermal expansion coefficient such as titanium; and casing 64 is made of a material of substantially higher thermal expansion coefficient such as aluminum. By proper selection of casing lengths the expansion and contraction of the casings can be used to offset one another and maintain the overall length of structure 60 nearly constant.

What is claimed is:

1. A near constant length thermal expansion structure comprising:
    an elongated hollow body having one end thereof adapted to be attached to an associated structure and supporting means mounted on the other end thereof;
    an elongated compensator strut slidably mounted in said hollow body, said compensator strut including an end connector mounted on end thereof that is slidably supported in said supporting means, said end connector being adapted for connection to an associated structure;
    said elongated hollow body including an outer casing and an inner casing mounted in said outer casing in spaced and concentric relation with respect thereto, said inner and outer casings being composed of materials having different coefficients of expansion so that thermal changes will result in the inner and outer casings achieving different lengths due to contraction and expansion; and
    linkage means mounted on said hollow body and actuated by relative movement between said inner and outer casings, said linkage means being connected to the other end of said compensator strut opposite the slidably supported end to move said strut relative to said hollow body an amount determined by the relative amounts of movement between said inner and outer casings.

2. The structure recited in claim 1 wherein said inner and outer casings are attached to one another at one of their ends so as to remain fixed relative to one another and the other ends of said casings are left free to expand and contract to different lengths when subjected to thermal changes, the free ends of said casings being connected to said linkage means for imparting movement thereto.

3. The structure recited in claim 2 wherein said linkage means comprises:
    a first hinge mounted on the free end of said outer casing,
    a second hinge mounted on the free end of said inner casing in radial alignment with respect to said first hinge and spaced therefrom; and
    a lever having one end thereof pivotally mounted in said first hinge, the other end pivotally mounted to said compensator strut and intermediate the ends thereof said lever being pivotally mounted to said second hinge; whereby, relative movement of said inner and outer casings will cause said lever to pivot and thereby move said compensator strut relative to said hollow body.

4. The structure recited in claim 3 wherein said inner casing is aluminum and said outer casing is titanium.

5. The structure recited in claim 4 wherein said compensator strut is an elongated tubular body and further comprises bracket means mounted on said other end of said compensator strut for pivotally mounting said other end of said lever to the compensator strut; whereby, pivotal movement of said link means will slide said compensator strut relative to said inner and outer casing.

6. The structure recited in claim 5 which further includes heat conducting means connected between said inner and outer casing to facilitate heat transfer therebetween.

7. The structure recited in claim 6 wherein said heat conducting means are foil strips fastened to said inner and outer casing.

* * * * *